(12) United States Patent
Heinonen et al.

(10) Patent No.: US 9,752,916 B2
(45) Date of Patent: Sep. 5, 2017

(54) PROBE FOR MONITORING THE SURFACE LEVEL OF A FLUID IN A VESSEL AND A METHOD OF INSTALLING THE PROBE IN THE VESSEL

(71) Applicant: Sulzer Management AG, Winterthur (CH)

(72) Inventors: Jussi Heinonen, Hamina (FI); Pasi Kvick, Kuopio (FI); Anssi Lehtonen, Inkeroinen (FI); Seppo Nyman, Poitsila (FI); Reijo Vesala, Kotka (FI); Vesa Vikman, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 63 days.

(21) Appl. No.: 14/911,890

(22) PCT Filed: Aug. 13, 2014

(86) PCT No.: PCT/EP2014/067303
§ 371 (c)(1),
(2) Date: Feb. 12, 2016

(87) PCT Pub. No.: WO2015/028306
PCT Pub. Date: Mar. 5, 2015

(65) Prior Publication Data
US 2016/0202103 A1    Jul. 14, 2016

(30) Foreign Application Priority Data

Aug. 28, 2013    (EP) .................................... 13182024

(51) Int. Cl.
| *G01F 23/24* | (2006.01) |
| *G01F 23/26* | (2006.01) |
| *G01F 23/14* | (2006.01) |

(52) U.S. Cl.
CPC ............ *G01F 23/242* (2013.01); *G01F 23/14* (2013.01); *G01F 23/24* (2013.01); *G01F 23/248* (2013.01); *G01F 23/26* (2013.01); *G01F 23/268* (2013.01)

(58) Field of Classification Search
CPC ........ G01F 23/242; G01F 23/14; G01F 23/24; G01F 23/241; G01F 23/248; G01F 23/26; G01F 23/261; G01F 23/263; G01F 23/268
See application file for complete search history.

(56) References Cited

U.S. PATENT DOCUMENTS

| 2,797,284 A * | 6/1957 | Brooke .................. G01F 23/24 137/392 |
| 3,313,902 A | 4/1967 | Akin et al. |
| | (Continued) | |

FOREIGN PATENT DOCUMENTS

| CN | 1938569 A | 3/2007 |
| CN | 101535781 A | 9/2009 |
| | (Continued) | |

OTHER PUBLICATIONS

International Search Report and Written Opinion issued Dec. 19, 2014 in PCT/EP2014/067303, Filed Aug. 13, 2014.

*Primary Examiner* — Justin Olamit
(74) *Attorney, Agent, or Firm* — Global IP Counselors, LLP

(57) ABSTRACT

A method of installing a probe for monitoring a surface level of a fluid in a vessel inside the vessel from outside the vessel, the method includes providing a vessel side wall with a first opening, providing the vessel side wall with a second opening, passing the second end of the probe, a second device for fastening the probe and a detection unit of the probe through the first opening and inside the vessel, orienting the second end of the probe towards the second (Continued)

opening, attaching the second end of the probe to the side wall of the vessel at the second opening, and fastening the first end of the probe to the side wall of the vessel at the first opening.

18 Claims, 6 Drawing Sheets

(56) References Cited

U.S. PATENT DOCUMENTS

| | | | |
|---|---|---|---|
| 5,167,769 | A | 12/1992 | Jack et al. |
| 6,016,697 | A * | 1/2000 | McCulloch ............ G01F 23/266 73/304 C |
| 6,164,132 | A | 12/2000 | Matulek |
| 2005/0242966 | A1 | 11/2005 | Picco et al. |
| 2010/0251816 | A1 | 10/2010 | Bahorich et al. |
| 2012/0184932 | A1 | 7/2012 | Giezendanner et al. |
| 2013/0125645 | A1* | 5/2013 | Bahner ................... G01F 23/26 73/304 C |

FOREIGN PATENT DOCUMENTS

| | | |
|---|---|---|
| CN | 102472657 A | 5/2012 |
| EP | 2199760 A1 | 6/2010 |
| JP | 2005283201 A | 10/2005 |
| WO | 03052357 A1 | 6/2003 |

\* cited by examiner

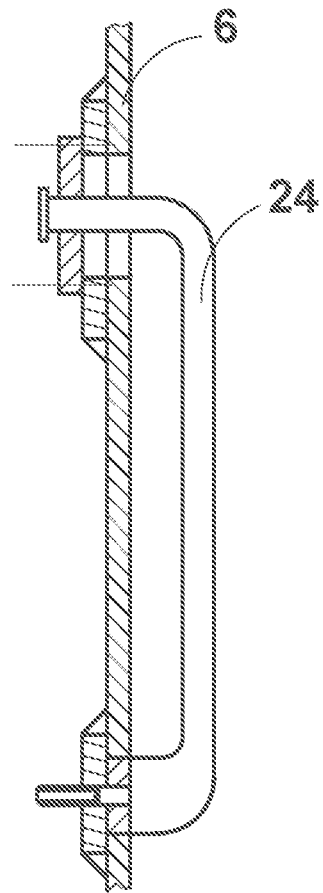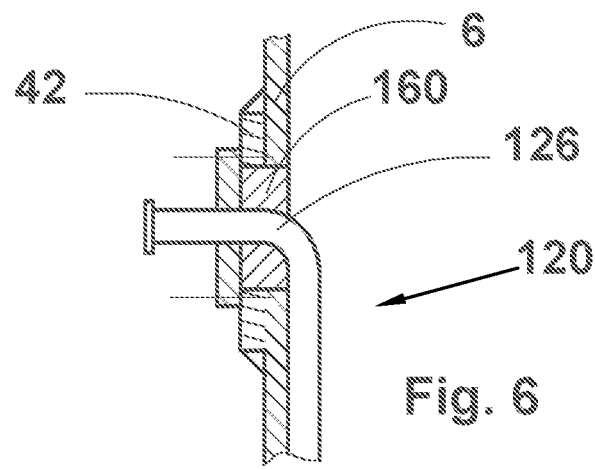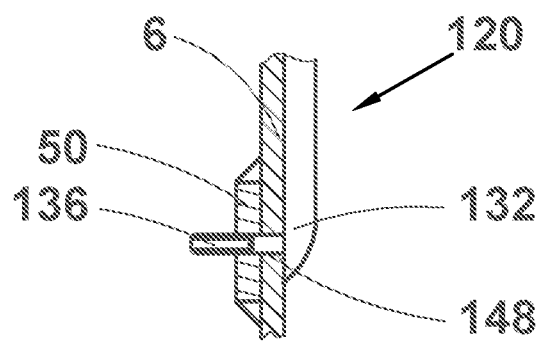
Fig. 5
Fig. 6
Fig. 7
Fig. 8
Fig. 9

PROBE FOR MONITORING THE SURFACE LEVEL OF A FLUID IN A VESSEL AND A METHOD OF INSTALLING THE PROBE IN THE VESSEL

CROSS-REFERENCE TO RELATED APPLICATIONS

This application is a U.S. National State Application of International Application No. PCT/EP2014/067303, filed Aug. 13, 2014, which claims priority to European Application No. 13182024.3, filed Aug. 28, 2013, the contents of which is hereby incorporated herein by reference.

BACKGROUND

Field of Invention

The present invention relates to a probe for monitoring the surface level of a fluid in a vessel, and to a method of installing the apparatus in the vessel. The apparatus of the present invention is applicable in all such vessels, containers, tanks, drop legs, blow tanks, reactors, etc. where information on the surface level of the fluid present in the vessel is needed for controlling the application. An example is a vessel from which the fluid is about to be pumped further such that the surface level in the vessel is maintained within certain limits, whereby the operation of the feed and/or discharge pump have/has to be adjusted in relation to the surface level in the vessel.

Background Information

The prior art discusses dozens of ways for monitoring the surface level of a fluid in a vessel.

Pressure sensors may be used in cases where the fluid in the vessel is an easily flowable one, like water, and where the diameter of the vessel is substantially large. In other words, pressure sensors are applicable only in cases where the pressure value may be measured in a reliable and reproducible manner.

Capacitive sensors or wires are widely used, but they are very sensitive to the consistency or dry material content of the fluid. They also collect dirt and lose their sensitivity fairly quickly. Additionally, they, especially the wires are mechanically weak, i.e. they may loosen or break, and, at worst, end up in the fluid and along with the fluid in the pump and in the further process.

As an example of documents discussing capacitive sensors may be mentioned in US-A-2012/0184932, which discusses a drainage pump unit for aspirating fluids by a suction pump arranged in a suction pump housing, wherein a fluid collection container can be secured releasably on the suction pump housing, and wherein a capacitive filling level sensor is arranged on the suction pump housing for detecting a filling level in the fluid collection container. The filling level sensor has at least two electrodes, which are arranged at a distance from each other and extend along a common path. A first of the electrodes is in one piece, and a second of the electrodes is segmented. Here the fluid collection container has a rectangular cross section and the electrodes are arranged directly on one of the planar side walls of the container.

US-A1-2010/0251816 discusses an aircraft fuel measurement system that utilizes one or more digital probes that is/are arranged inside the fuel tank. The probes are formed of two concentric tubes arranged at a certain distance from one another and includes brackets for mounting the probe/s inside the fuel tank.

JP-A-2005283201 discusses yet another capacitive system for monitoring the liquid level in a reducing agent container, the reducing agent being used in an emission control device of a motor vehicle. The probe is formed from two concentric tubes arranged at a certain distance from one another and includes a bracket for mounting the probe via an opening in the top cover of the container inside the urea container.

WO-A1-03052357 discusses a filling level sensor comprising an electrode assembly with several individual electrodes and a backplate electrode common to the electrodes disposed outside the vessel within a hose pipe, which preferably extends over the entire height of said vessel and the ends of which are flow-connected respectively to a tapping connector and a feed connector of the vessel. In other words, the electrode arrangement is arranged outside the vessel in a separate pipe extending over the entire height of the vessel so that since the pipe is in flow communication with the vessel the liquid level in the pipe is the same as that in the vessel, as long as the liquid is easily flowable.

US-A1-2005/0242966 discusses a system for detecting the overflow of a liquid from a vessel, such as a bathtub. The vessel wall includes pairs of sensors, which may be electrical, measuring resistance, or optical, detecting an obstructed line of sight.

U.S. Pat. No. 5,167,769 discusses a sensor for the detection of wood chip level in a digester, for example, a Kamyr digester, which consists of: (a) a probe, several meters long, vertically mounted inside the top part of the digester; (b) a series of bare metal electrodes in the side of the probe, spaced typically a few centimeters apart, and electrically insulated from the probe wall; (c) electronic circuit processing to allow any pair of electrodes to be selected, and (c) a device (or means) to allow the electrical properties of a liquor or wood chip and liquor mixture between the electrodes of a pair to be measured, and the level deduced from the measurement. Here the probe has been arranged along the vertical centerline of the digester.

U.S. Pat. No. 3,313,902 discusses controlling of pumping an electrically conductive liquid to a tank by an electrode arranged angularly inside the tank. The wall of the tank functions as the second electrode. When installing the electrode in the tank, the tank wall first includes an opening, and the opening includes a sleeve-like coupling member, through which the electrode may be slipped inside the tank. After the electrode is in its inclined position in the tank a seal ring and another sleeve like coupling member is slid over the electrode whereafter the two coupling members are tightened to one another.

Radar-based devices have also been experimented, but it has been learned that they are sensitive to steam, to the topography of the surface and to various structures inside the vessel. Additionally, the construction and size of the radar-based devices set their own demands on the positioning of the device in the vessel such that it does not interfere into the internal flows of fluid in the vessel.

Radiometric measurements have their own downsides, i.e. limited acceptance due to the use of the radiation source, limited operational time, required permits as well as other specific regulations.

As discussed above, all devices used, in one way or another, for measuring a surface level of a fluid in a vessel have their own problems and downsides. There are additional problems when the fluid is not a liquid that behaves like water. The fluid may have a consistency, i.e. dry matter content, of, for instance, between 8 and 40%. The fluid may be lumpy whereby the surface topography is very uneven.

The fluid may be hot whereby steam evaporates out of the fluid. The fluid may be hardly flowable whereby 1) there is no clear surface in the vessel, 2) it is out of the question to arrange any internal structures in the vessel such that they are located at a considerable distance from the wall of the vessel, i.e. at the main downward flow area in the vessel, as such structures would interfere into the internal flows of fluid in the vessel and/or would be subject to breakage when possibly lumpy material drops on or tends to bend such structures, and 3) the fluid does not create any pressure that could be used in monitoring the surface level of the fluid.

A yet further problem in the prior art devices or apparatus used in monitoring the surface level in a vessel is that they are either devices that have been integrated into a structure, for instance a wall, of the vessel, or they may be installed or repaired only by entering the interior of the vessel. The former type of device is mainly in use in very small apparatuses, where, in case of malfunction, the entire wall of the apparatus or the entire apparatus may be changed. Retrofitting of the latter type of apparatus in substantially small vessels (no entrance for installation personnel) or maintenance of apparatus in such devices has not, this far, been paid any attention to. Yet another problem in some prior art devices is that the probe is arranged to be installed in the vessel via an opening in the top cover of the vessel. If the height of the vessel is several meters and the level of the fluid surface is supposed to fluctuate somewhere in the middle part of the vessel the required length of the probe makes the probe very vulnerable unless it is built sturdy enough. Another problem relating to the probe arranged to the top cover of the vessel may be seen in vessels where there is, in practice, no top cover at all, but the vessel is formed of a bend at the top thereof and a downflow pipe both having the same constant diameter. In such a case, the flow in the vessel takes place over the entire cross section of the vessel, and would subject a top arranged probe to considerable stress.

The above problems contain such multitude or variety of requirements relating to strength and varying process conditions that preclude that the vessel has to be manufactured of metal, which is still the preferred material for the most demanding operating environments.

SUMMARY

Thus, an object of the present invention is to eliminate at least one of the above mentioned drawbacks or problems by a novel probe for monitoring the surface level of a fluid in a vessel.

Another object of the present invention is to develop a novel method of installing the probe for monitoring the surface level of a fluid in a vessel.

A further object of the present invention is to develop a novel probe for monitoring the surface level of a fluid in a vessel, the probe being easily installable and maintainable from outside the vessel and being positioned in the vessel such that it does not interfere in the flow dynamics in the vessel and does not easily get damaged in the vessel.

The characterizing features of the probe for monitoring the surface level of a fluid in a vessel in accordance with the present invention by which at least one of the above discussed problems are solved become apparent from the appended claims.

In a similar manner the characterizing features of the method of installing the apparatus in the vessel become apparent from the appended claims.

The present invention brings about a number of advantages, like for instance
 a. The actual apparatus for performing the surface level measurement may be manufactured separate from the manufacture of the vessel,
 b. It is easy to utilise mass- or series-production in the manufacture of the apparatus,
 c. The installation of the apparatus is simple and takes very little time,
 d. The apparatus may be installed in both new vessels as well as in vessels that have been in use earlier,
 e. The apparatus does not disturb the downward flow in the vessel,
 f. The use of the apparatus is not limited to vessels containing easily flowable liquids like water or oil,
 g. The apparatus is not limited to any specific consistency or dry matter content,
 h. The presence of steam does not disturb the measurement, and
 i. The maintenance of the apparatus is easy, as the apparatus may be easily removed from the vessel.

As to the above listed advantages it should be understood that each embodiment of the invention may not lead to each and every advantage, but just a few of those.

BRIEF DESCRIPTION OF THE DRAWINGS

This invention will be explained in more detail hereinafter with reference to the drawings.

FIG. 5 illustrates a partial cross section of the surface level monitoring probe of FIG. 3 fastened in accordance with a second preferred embodiment of the present invention on the inside wall of a vessel, FIG. 6 illustrates a partial cross section of the first end of the surface level monitoring probe of FIG. 3 fastened in accordance with a third preferred embodiment of the present invention on the inside wall of a vessel, FIG. 7 illustrates the second end of the surface level monitoring probe of FIG. 3 fastened in accordance with a fourth preferred embodiment of the present invention on the inside wall of a vessel, FIG. 8 illustrates a schematical cross section of a probe including a first optional sealing device to be arranged between the probe and the vessel wall, FIG. 9 illustrates a schematical cross section of a probe including a second optional sealing device to be arranged between the probe and the vessel wall and FIG. 10 illustrates a drop leg or a storage tower including the probe for monitoring the surface level of a fluid in accordance with a second preferred application of the present invention,

DETAILED DESCRIPTION OF THE EMBODIMENTS

Figure 1:
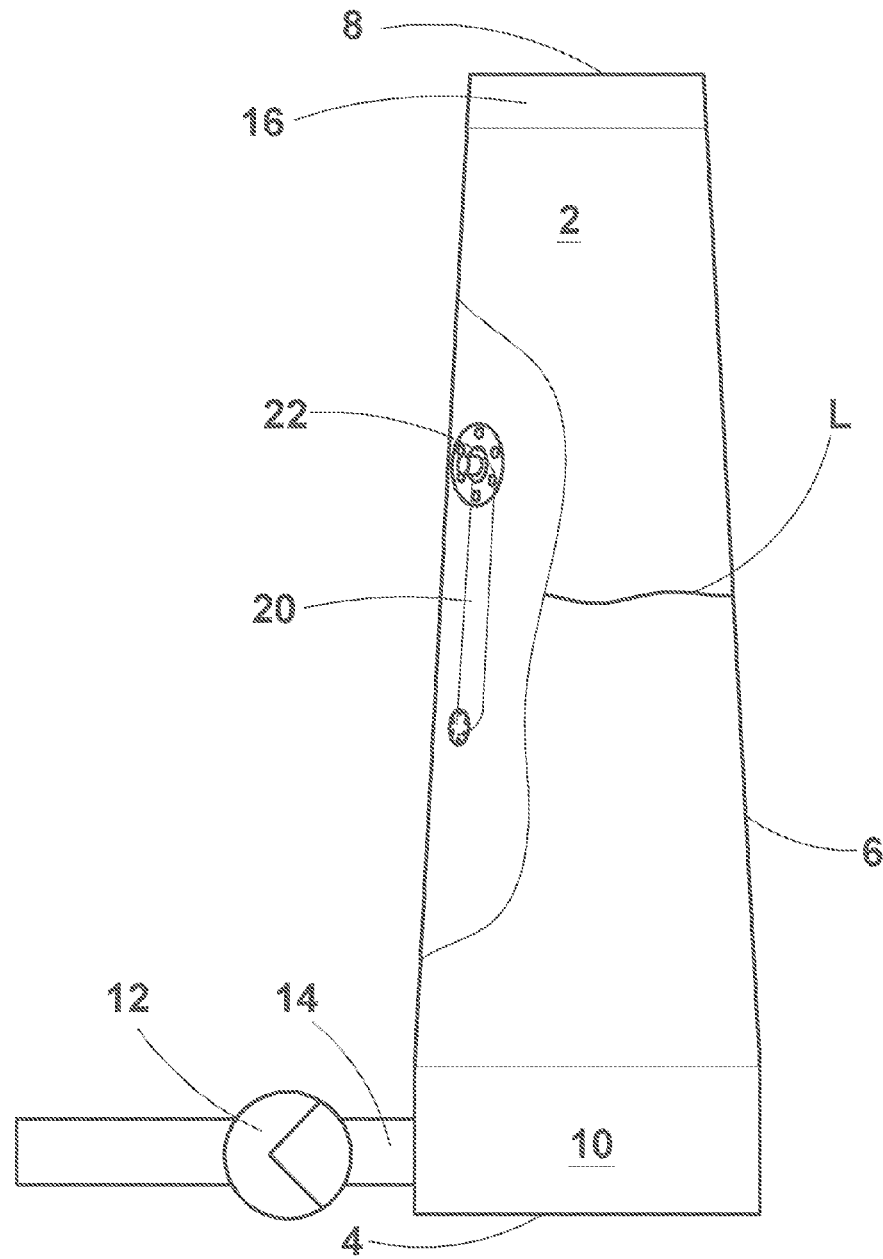
FIG. 1 illustrates a drop leg or a storage tower including the probe for monitoring the surface level of a fluid in accordance with a first preferred application of the present invention.

FIG. 1 illustrates in a relatively large scale a drop leg or a storage tower, from now on called more generally a vessel 2, including a bottom wall 4, a more or less upright side wall or walls 6 and a top cover 8. Further the vessel 2 has, above the bottom wall, a bottom part 10 to which a pump 12 is coupled for discharging a fluid from the vessel 2. The pump 12, with the help of the vessel outlet 14, may be positioned either to the side wall 6 or to the bottom wall 4 of the vessel. Further, the vessel 2 has a top part 16 via which the fluid is normally introduced in the vessel 2. However, it has to be understood that in prior art there are vessels into which the fluid enters via inlet device (or means) arranged through the bottom wall 4 or the side wall 6 of the vessel 2.

The vessel 2 of FIG. 1 further includes, in accordance with a first preferred application of the present invention, the apparatus 20 for monitoring the surface level of a fluid in the vessel 2, i.e. a so-called probe. For installing the surface level monitoring apparatus or probe 20 inside the vessel 2 from outside the vessel 2 the wall 6 of the vessel 2 includes a first opening 22 for receiving the probe comprising electrodes and electric wiring transmitting the surface level-related information from the probe 20 to a control unit (not shown), i.e. a computer or the like device. Both the first opening 22 and the probe 20 include a device (or means) for fastening the probe 20 to the vessel wall 6 at its first end. For the opposite, i.e. the second end of the probe 20 a second device (or means) including a second opening or hole for fastening the probe to the wall 6 of the vessel 2 are provided. For ease of installation and safe use the probe 20 is rigid or inflexible such that possible turbulence or other unfavourable flow conditions in the vessel are not able to bend and loosen the probe from its fastenings. The length of the probe 20 is, in this first preferred application of the present invention, arranged to be such that it covers the area where the surface level L is supposed to be maintained. Naturally, the probe 20 may extend over the entire height of the vessel 2, but, as each vessel normally has its upper and lower practical limits or borderlines for the surface level L, which are maintained in ordinary operating conditions, the probe 20 extends usually only slightly outside the desired surface level range. Preferably, the probe 20 is oriented along the wall 6 of the vessel 2 in an axial plane such that the probe 20 is oriented in the direction of the fluid flow in the vessel 2, whereby the probe 20 forms a minimal obstruction to the flow. In case the vessel wall is conical the actual orientation of the probe may vary between the direction of the wall and the direction of the fluid flow (normally vertical) in the vessel. However, if the cross section of the vessel reduces in downward direction it is preferable that the probe is parallel with the wall of the vessel so that no wedge-shaped cavity may be formed between the probe and the wall. The above needs to be taken into account especially when the fluid is lumpy and, thus, could be caught in the wedge-shaped cavity. The arrangement of the openings may be freely chosen, i.e. in all embodiments of the present invention the second opening may be below (as shown) or above the first opening.

Figure 2:
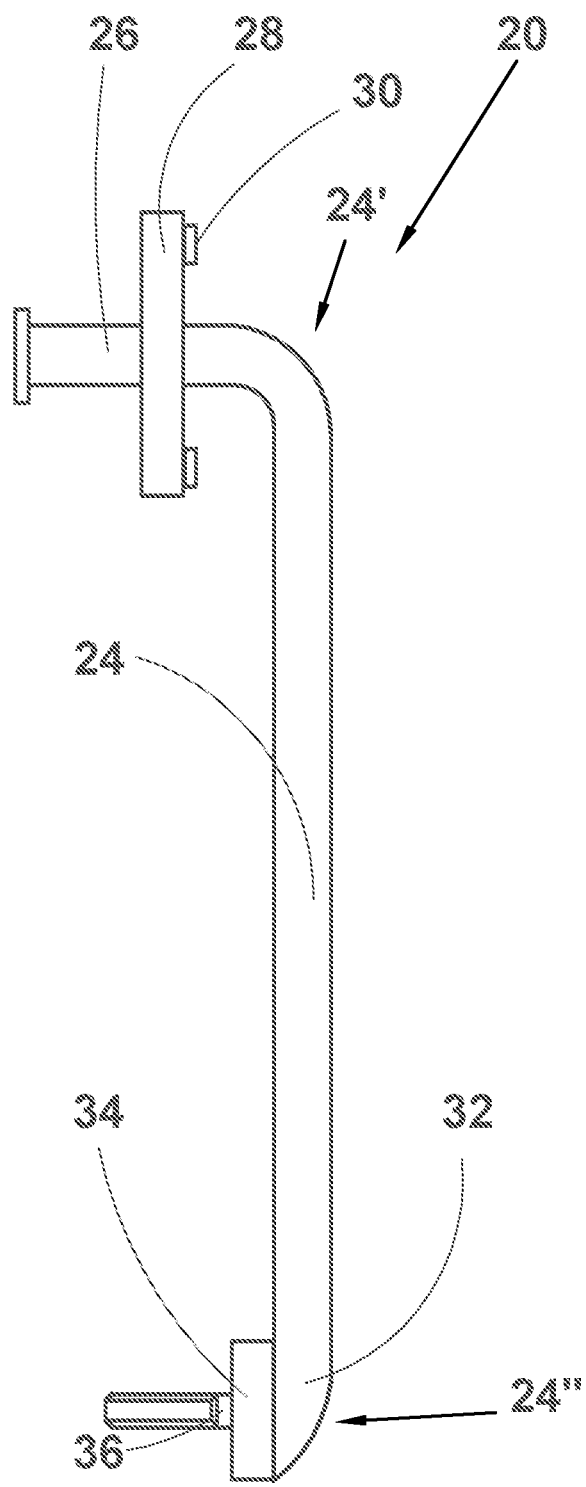
FIG. 2 illustrates a side view of the surface level monitoring probe of FIG. 1.

FIG. 2 illustrates in more detail a surface level monitoring apparatus or probe 20 of FIG. 1. The probe 20 is formed of a rigid or inflexible detection unit 24 and, at the first end 24' of the detection unit 24, a first end member 26 housing a device (or means) (not shown) for transmitting surface level-related information out of the vessel and a first device (or means) 28 for fastening the probe to the wall of the vessel and, at the second end 24" of the detection unit 24, a second end member 32 including a second device (or means) 34 and 36 for fastening the probe to the wall of the vessel. The probe 20 is a substantially rigid or inflexible element such that it does not bend (at least not by mere gravity) easily, whereby the movement of the second end of the probe may be controlled by turning or moving the first end of the probe. However, as will be later on discussed in more detail, the probe may be formed of two or more in itself rigid sections joined to one another by device (or means) of a flexible hinge-like member. The transmitting member may be a wiring (as shown in FIG. 2) taking the surface level-related information to a control unit. The transmitting member may also be a wireless transmitter used for sending the surface level-related information to a receiver arranged in communication with the control unit. The transmitting member, i.e. the wiring or the wireless transmitter is (shown in FIG. 3) arranged within, preferably, but not necessarily, a tubular first end member 26 for protecting the wiring or the wireless transmitter during the installation and use of the probe. The tubular member, or in more general terms, the first end member 26 of the probe 20 is formed of a tubular bend, which joins the detection unit 24 arranged substantially parallel with the wall of the vessel to the first fastening device 28. The phrase 'substantially parallel" has to be understood as meaning a direction from a direction parallel with the wall of the vessel to a direction parallel with the fluid flow in the vessel (normally vertical direction). Preferably, but not necessarily, the end member 26 extends at least to the level of the fastening device 28 in a direction perpendicular to the wall of the vessel, whereby the direction of the detection unit 24 and the direction of the part of the first end member extending to the level of the fastening device 28 form an angle of about 90 degrees, i.e. the two directions are at substantially right angles to one another. However, it is also possible, though constructionwise more challenging, to bring the end member in another angle to the level of the fastening device 28. In such a case the fastening device 28 should be specifically designed to match the inclined end member with the substantially (normally) vertical wall of the vessel. The first end member 26 includes the first fastening device, in this case (in an exemplary manner) a flange 28 having holes (not shown) for fastening the probe 20 to the side wall of the vessel. The diameter of the first flange 28 is larger than that of the first opening in the wall of the vessel. Further at the first end 24' of the probe 24, the first fastening device, i.e. the first flange 28, may include, if desired, a seal 30 for sealing the connection between the first flange 28 and the side wall of the vessel. The seal 30 may be, if desired or needed, compressible such that it conforms to the curvature of the side wall of the vessel. The second end member 32 of the probe 20 includes a second flange 34 having a diameter clearly smaller than that of the first flange 28, in fact smaller than the dimensions of the first opening in the vessel wall. The second flange 34 or the second end member 32 of the probe 20 or both includes a bolt 36 extending substantially at right angles to the main orientation of the probe 24. The bolt 36 is used for fastening the second end of the probe 20 to the vessel wall by a nut threaded on the bolt. As to the flanges it should be understood that they may be whatever appropriate shape, i.e. triangular, square, rectangular, etc in addition to the round ones referred to above by the word diameter. Thus, generally speaking, the dimensions of the first flange 28 are chosen so that the dimensions are greater than those of the first opening 22. In a similar manner, the dimensions of the second flange 34 are smaller than those of the first opening 22, or at least such that the dimensions of the first opening allow the entrance of the second end of the probe inside the vessel.

Figure 3:
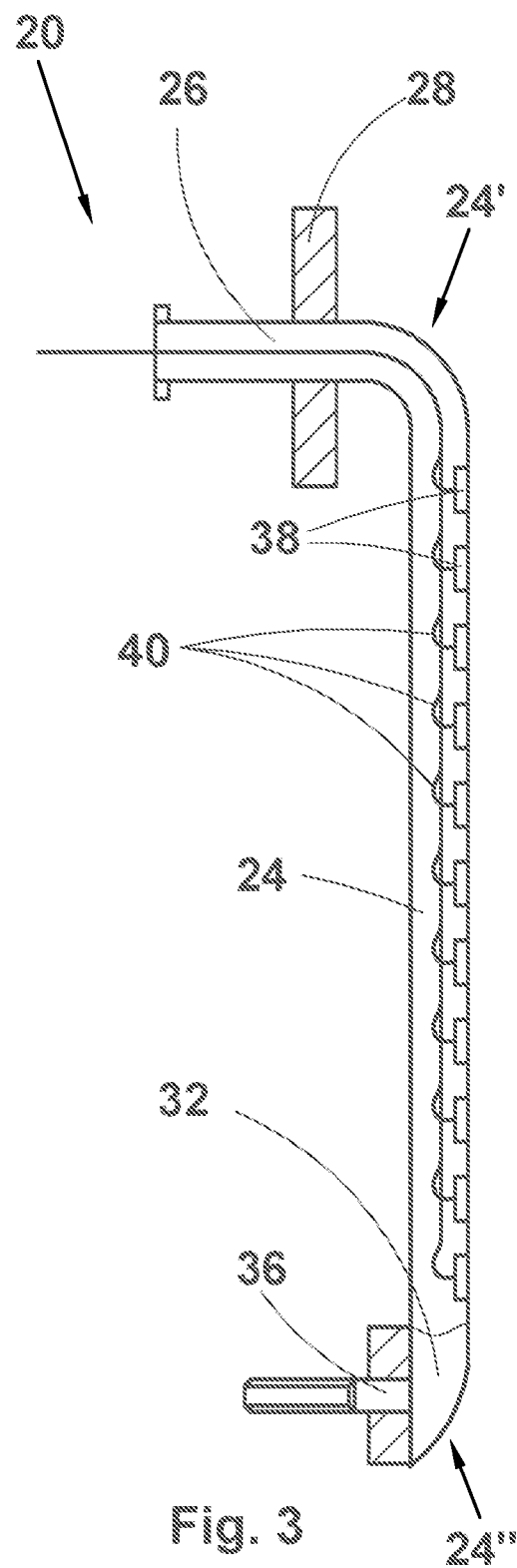
FIG. 3 illustrates a partially cross sectional side view of the surface level monitoring probe of FIG. 2.

FIG. 3 shows the internal structure of the detection unit 24 and the probe 20 and the first and second fastening devices 28 and 36 thereof in accordance with a first preferred embodiment of the present invention in some more detail. The detection unit 24 includes a set of sensors or electrodes 38 facing the interior of the vessel. The sensors or electrodes 38 are electrically insulated from both the detection unit 24 and from each other. The sensors or electrodes 38 are sealed in the openings in the probe wall such that no fluid is able to enter the inside of the probe. However, it should be understood that with some particular sensors or electrodes, or with a particular material of the detection unit 24, the physical contact between the sensors or electrodes and the fluid in the vessel is not necessary, but the electrodes may remain within a closed detection unit 24. Each sensor or electrode 38 includes at least one wire 40 forming a part of the wiring, or a wireless transmitter for transmitting the information from the electrodes 38 to the control computer or a like device (or means) utilizing the information, for instance, for adjusting the capacity of the discharge pump and/or feed pump such that the surface level is maintained within prescribed limits. The operation of the probe 20 of the invention is very often based on the electrical conductivity of the fluid in the vessel, though any applicable sensor may be arranged to the wall of the detection unit, or more generally in connection with the detection unit, including pressure sensors, too. As an example, the lowermost electrode may be used to feed electric current (either AC or DC) to the fluid in the vessel and the rest of the electrodes to receive the electric current. Based on the information received from the upper electrodes the control unit, normally a computer, is able to determine the surface level in the vessel. For instance, an electrode is able to send information to the control computer that it receives current from the lowermost electrode via the fluid only when the electrode in question is in contact with the fluid. The operation of the probe and the control system may be based on a number of electrical devices (or means), including but not limited to pressure, resistance, capacitance, electrical impedance tomography (EIT), electrical resistance tomography (ERT) and electrical capacitance tomography (ECT). At this stage it should be understood that the present invention may utilize all such electrical devices for monitoring a surface level in a vessel that use two or more electrodes As to the construction of the transmitting device and the first flange 28 the following has to be understood. First, though one of the purposes of the first end member 26 is to lead the wires bringing information from the electrodes out of the vessel or carry the wireless transmitter, the first end member 26 may terminate to the level of the first flange 28. In such a case the wiring acting as the transmitting device may be include a socket-plug connection, or the wireless transmitter is positioned to the level of the first flange, too.

As already briefly discussed above an option for transmitting the information from the electrodes to the control unit is the utilization of a wireless transmission, whereby the transmitter may be arranged in connection with the first end member 26 extending either outside the vessel or terminating substantially to the level of the vessel wall. In some specific cases the transmitters may be arranged directly in connection with the electrodes, too. The wireless communication may be based on radio communication, microwave communication, infrared (IR) communication or sonic, especially ultrasonic short range communication just to name a few well-known options of wireless communication and without any intention of limiting the invention to the use of such. Naturally, as long as the transmitter is in communication with the electrode the receiver is in connection, or at least in communication, with the control unit. Second, the first flange 28 may not only be welded, soldered or glued on the first end member 26, but it is also possible that the first end member 26 and the first flange 28 include threads, for instance trapezoidal threads, for fastening the flange on the first end member 26, whereby the flange may be replaced with or considered as a nut. Also, in some specific cases it is possible to use the threadable sleeve as a device (or means) for fastening the first end of the probe to the wall of the vessel. Third, various types of quick couplings may also be used for fastening the second flange, or a corresponding member, on or to the first end member. A so-called Sandvik-collar and a bayonet are, for instance, preferred options. In other words, all the above discussed fastening options may be applied with any above discussed type of transmitting the surface-related information to the control unit, i.e. the wireless transmitter, the continuous wiring or the wiring including a socket-plug connection.

Figure 4:
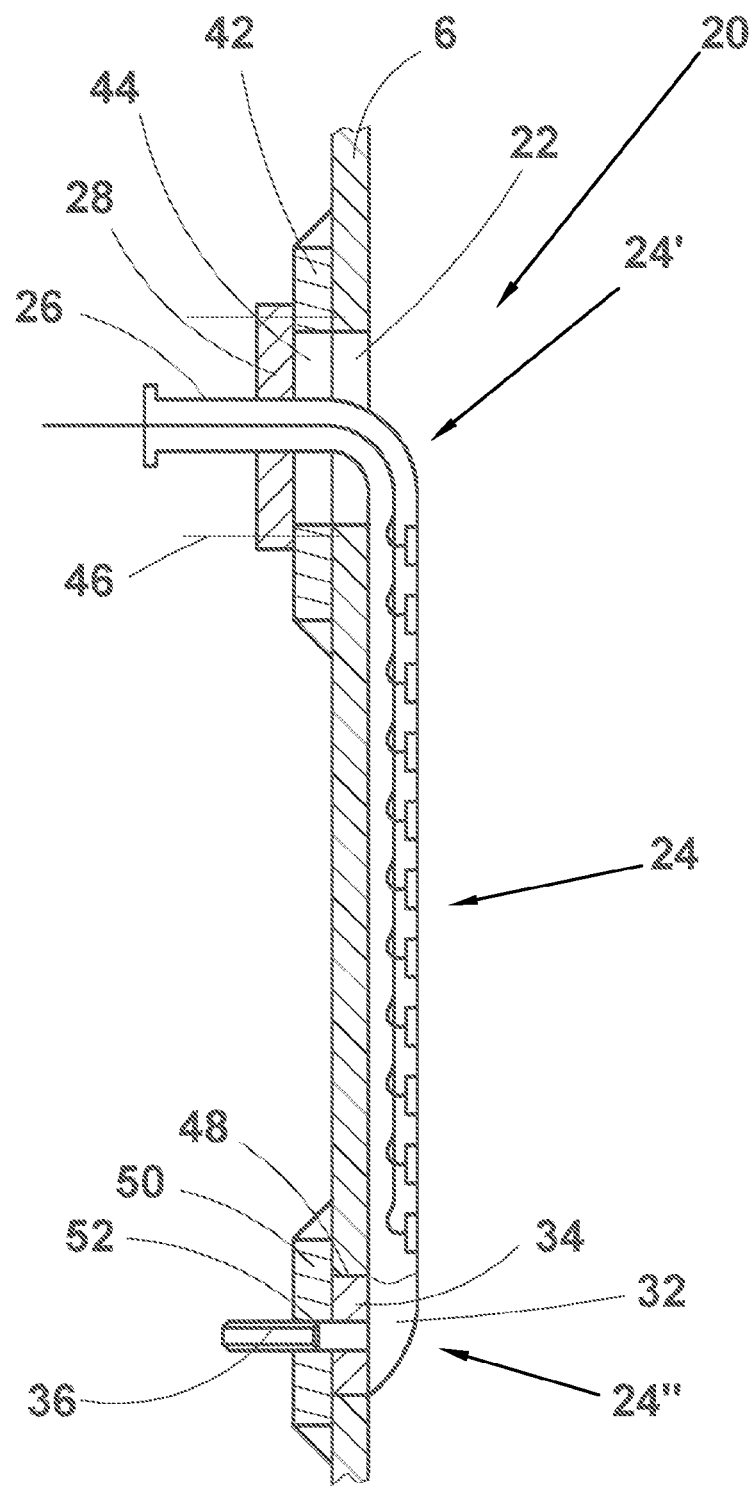
FIG. 4 illustrates a partial cross section of the surface level monitoring probe of FIG. 3 fastened in accordance with a first preferred embodiment of the present invention on the inside wall of a vessel.

FIG. 4 illustrates the installation of the probe 20, or actually its detection unit 24, on or against the inside of the wall 6 of the vessel in accordance with a first preferred embodiment of the present invention. For the installation of the probe 20 the vessel wall 6 includes a first opening 22 the dimensions/size of which are/is sufficient for allowing the second end of the probe, in this case the second flange 34 of the second end member 32 of the probe 20, to be pushed in the vessel through the first opening 22. The first opening 22 may be round, rectangular, square, triangular or of any desired shape. In this embodiment of the invention the opening 22, or actually the wall 6 of the vessel around the opening 22, includes a first support plate 42 that is, preferably, but not necessarily, welded on the wall 6. Other fastening ways are, depending on the plate material, soldering or gluing. The first support plate 42 has an opening 44 the dimensions/size of which are/is also sufficient for allowing the second end of the probe, in this case the second flange 34 of the second end member 32 of the probe 20, to be taken inside the vessel through the opening 44. Preferably, but not necessarily, the openings 22 and 44 are of the same size and shape. The first support plate 42, for fastening the probe 20 to the wall 6, includes threaded holes, or optionally bolts or threaded sleeves extending outwards at right angles to the surface of the first support plate 42. The threaded holes or bolts or sleeves used for fastening the first flange 28 to the first support plate 42 have been shown exemplarily by their centrelines 46. In a corresponding manner the first flange 28 includes holes for bolts or threaded sleeves, i.e. either for bolts to be threaded into the threaded holes in the first support plate 42 or for bolts or threaded sleeves extending from the first support plate 42 outwardly. In the former option the bolts to be threaded in the threaded holes may extend also into the wall 6 in case threaded holes are disposed therein, too. Either the support plate 42 or the first flange 28 may include an appropriate sealing 30 (shown in FIG. 2) for preventing the fluid from leaking from the vessel to the outside of the vessel 2.

The lengthwise positioning of the first flange 28 on the first end member 26 of the probe 20 and the thickness of both the first support plate 42 and the vessel wall 6 is, in this embodiment, chosen such that the detection unit 24 lies against the inside of the vessel wall 6. In other words, the first flange 28 on the first end member 26 is arranged at a distance from the detection unit 20, the distance corresponding at least to the thickness of the wall 6 of the vessel (in case there is no first support plate in use) or to the combined thickness of the first support plate 42 and the wall 6.

The vessel wall 6, for the second end member 32 of the probe 20 with its fastening device 34 and 36, includes a second opening 48. The opening 48, or actually the wall 6 of the vessel around the opening 48, includes a second support plate 50 that is, preferably, but not necessarily welded on the wall 6. The fastening may take place, for instance by soldering or gluing, too. The second support plate 50 has a hole 52 for receiving the second fastening device 36, here a bolt, used for fastening the second end 24" of the probe 20 to the vessel wall 6 by a nut (not shown). The size/dimensions of the second opening 48 on the vessel wall 6, in this embodiment, matches/match to the dimensions of the second flange 34 such that when the detection unit 24 is attached against the wall 6, the second flange 34 fills the opening 48. If desired, a sealing like an O-ring may be arranged in connection with the second flange 34 for sealing the gap between the second opening 48 and the second flange 34. Preferably, the thickness of the second flange 34 corresponds to that of the vessel wall 6, whereby the fastening of the probe 20 by the bolt 36 does not subject the probe 20 to any bending forces.

At this stage it should be understood that there are many variations for the fastening of the second end of the probe to the vessel wall 6. The following ways of fastening the second end of the probe are interchangeable and may be used with any way of fastening the first end of the probe.

a. First, the bolt 36 may be fixed to the second end member 32 of the probe such that the second flange 34 is just inserted on the bolt 36, i.e. the second flange may be considered a mere device (or means) for filling the second opening in the wall of the vessel.

b. Second, the second flange may be left out entirely, whereby the second hole remains open in the installation, and the bolt extends from the second end of the probe through the second opening and the hole in the second support plate to the outside of the vessel.

c. Third, the second flange may be left out entirely, as the second opening in the wall and the hole in the second support plate are, in practice, of the same diameter as the bolt, and the bolt extends from the second end of the probe through the second small sized opening and the hole in the second support plate to the outside of the vessel.

d. Fourth, in the third option it is possible to manage without the second support plate, if the vessel wall is considered sturdy enough.

e. Fifth, the second end member of the probe, or the second flange attached to the second end member of the probe may include a threaded hole for the fastening bolt, whereby the earlier four options may be configured to work with a bolt threaded from outside in the threaded hole.

f. Sixth, the second flange may be fastened to the second end member of the probe and the bolt to the threaded hole in the second flange before installation of the probe into the vessel.

g. Seventh, the bolt may be welded to the second flange fastened to the second end member of the probe.

h. Eighth, the bolt may be replaced with a threaded sleeve fastened to the second flange or to the second end member of the probe. The sleeve aids in positioning the second end of the probe in the second opening. The fastening of the probe is in this case performed by threading a bolt into the threaded sleeve. Or, if it is a question of externally threaded sleeve, or externally threaded second flange, the fastening is performed by a large nut.

i. Ninth, the second flange and/or the second end member of the probe may include several bolts or threaded holes whereby the vessel wall and/or the second support plate also needs an equal number of holes for fastening bolts.

j. Tenth, the second support plate may be a separate loose plate (not fastened on the wall) that is positioned on the bolt or threaded sleeve after the end member together with the second flange or without such is aligned with the second opening. The second support plate just covers the second opening when a nut or bolt is threaded to the fastening device or the end member. Preferably the second support plate includes a sealing on its face facing the wall of the vessel. Also, it is possible that the second support plate has an extension comparable to the second flange extending into the second opening 48, whereby the extension functions as the filling of the second opening.

k. Eleventh, the second end of the probe may be secured to the wall of the vessel also with such devices (or means) that are permanently (not necessary to remove when the probe is changed of repaired) arranged on the inside wall of the vessel. Such devices may be a pocket-like member dimensioned to receive and to house the second end of the probe or a guide device (or means), which co-operate with a corresponding guide device or (means) of the probe. An example of such guide device is a sleeve, the inside cross section of which corresponds to the cross section of the second end of the probe. Another example is a pair of guide rails leaving therebetween a dovetail cavity and a corresponding dovetail cross section or extension arranged to the second end of the probe. All the above discussed or corresponding securing devices may, for instance, be arranged on the inside wall of the vessel by machining an opening in the vessel wall by removing a wall part from the opening, fastening the securing devices (or means) on the inside wall of the removed wall part and welding the removed wall part back to the vessel wall.

FIG. 5 illustrates a probe in accordance with a second preferred embodiment of the present invention. Here the rigid or inflexible detection unit 24 is installed at a distance from the wall 6 of the vessel, however outside the main downward flow area in the vessel, as any structure extending to such a main downward flow area may interfere into the internal flows of fluid in the vessel and/or could be subject to breakage when possibly lumpy material drops on or tends to bend such structure. Thus, in this embodiment the distance from the first flange to the detection unit is much more than the thickness of the wall of the vessel. The same applies to the second end of the probe, too, i.e. there is a distance between the second flange and the detection unit 24. In all other respects the construction of the probe and its fastening device are the same as in the probe of FIG. 4. Naturally, the various fastening options listed above in connection with FIG. 4 may be applied here, too.

FIG. 6 illustrates a probe 120 in accordance with a third preferred embodiment of the present invention. Here, the first end member 126 of the probe 120 includes a filling 160 that prevents the contents of the vessel from entering in an open cavity in the wall 6, i.e. the openings in the wall 6 and in the first support plate 42. This is important when the vessel contains fluid having solids that may settle and create a hard plug in the cavity or fluid that may start decaying if left in place for a longer period of time. The filling 160 may be of any appropriate material and/or it may include a sealing, like an O-ring, to prevent the fluid in the vessel from entering the gap between the filling and the first opening in the wall 6. Preferably, the material of the filling is compressible or flexible such that it easily allows the positioning of the filling in its cavity in the wall and in the first support plate. It is also possible that both the first flange and the filling are made of the same material (for instance steel or Teflon®) as one unitary member, as long as they are properly designed to match the opening in the wall.

FIG. 7 illustrates a probe 120 in accordance with a fourth preferred embodiment of the present invention. Here, the second end member 132 of the probe 120 directly includes a bolt 136 that extends out of the vessel via a second opening or hole 148 in the vessel wall 6 and a corresponding hole in the second support plate 50. However, if desired the second support plate 50 may be left out if the wall of the vessel is considered sturdy enough. In this embodiment it should be understood that, if desired, the second opening 148 in the vessel wall may be made smaller than in the embodiments where the second end member of the probe includes a second flange.

FIG. 8 illustrates a cross section of the detection unit 24, which includes a compressible sealing 54 the purpose of which is to be pressed against the wall of the vessel such that no fluid or suspension is able to enter between the probe and the wall. The sealing, for instance, adapts to weld seams in the wall of the vessel such that no gaps are left between the probe and the wall to the sides of the weld seam.

FIG. 9 illustrates a cross section of another detection unit 24, which includes two flexible skirts 56 on both sides of the detection unit 24. The skirts 56 function just like the sealing of FIG. 8, i.e. by closing any gap between the probe and the wall of the vessel.

The method of installing the surface level monitoring apparatus or probe in the vessel includes a number of steps. It is a common feature to all applications, embodiments and variants of the present invention that the surface level monitoring apparatus, i.e. the rigid or inflexible probe, has to be installed inside the vessel such that the personnel performing the installation are not able to, and in fact need not, enter the vessel. In other words, the size of the vessel may be so small that there is no room for assembly personnel, or the vessel may not have any manholes via which to enter the vessel. Therefore the probe has been designed such that it may be installed in place inside the vessel from outside the vessel. For that purpose the new installation starts by marking the desired positions of the first and second openings and/or holes needed in the installation of the probe on the vessel wall in accordance with the length of the probe, for instance by using an appropriate template. Next the first and second openings and/or holes are cut, i.e. drilled or machined in the vessel wall. Then the support plates, if needed, are fastened, preferably welded around the first and second openings and/or holes. Next the second end of the probe with its fastening device is pushed in the vessel through the first opening and the second end of the probe is oriented towards the second opening or hole arranged in the vessel wall for the fastening device at the second end member of the probe. It may be easier to align the second end of the probe and its fastening device with the second opening if the second opening is below the first opening via which the probe was taken in the vessel. However, it is clear that, for some reason, for instance if there is no room for working around the upper part of the vessel, the first opening may be close to the bottom of the vessel and the second opening or hole upper on the vessel wall. When the second end of the probe and its fastening device are aligned with the second opening or hole the probe may be fastened from both of its ends to the wall of the vessel.

However, it has to be understood that for aligning the second end of the probe with its fastening device additional accessories may be used. One option is a wire or thread that is taken inside the vessel via the second opening or hole for the second end of the probe. The wire or thread is then taken out through the first opening and fastened the second fastening device at the second end of the probe to the wire or thread. In this case it is easier if the first opening is below the second one whereby the thread or wire inserted in the vessel through the second opening is easy to catch by hand via the first opening. In the opposite case specific tools are needed for catching the thread or wire from below the level of the first opening, i.e. from in front of the second opening inside the vessel. It is also possible to attach a corresponding wire or thread to the second fastening device before the probe is taken into the vessel via the first opening, take the wire or thread first into the vessel and only thereafter the second end of the probe. However, if the second opening is below the first one, it is easy to catch manually the wire or thread via the second opening, provided that it is not a mere small hole for a bolt, and align the second fastening device of the probe with the second opening by drawing the wire or thread out of the second opening.

In view of the above it is easy to understand that, especially in small vessels, there is a certain correlation between the diameter of the vessel, the length of the probe and the dimensions of the first opening. This is especially true when the diameter of the vessel is small or the vessel, or rather the vertical area from where the surface level information is needed, is very high in relation to the diameter of the vessel. In these cases the diameter of the vessel limits the length of the probe, as, when being inserted in the vessel, the second end of a lengthy probe meets the opposite side wall of the vessel if the probe has a greater length than the diameter of the vessel. One way to manage this problem is to extend the first opening in vertical direction, for instance to elliptical shape, whereby the probe may be installed in a more inclined direction into the vessel.

In addition to the above discussed embodiments there are a few optional or additional embodiments that are worth discussing in the following.

In accordance with a fifth embodiment of the present invention the probe is made of two or more sections. In other words, the probe is divided in its longitudinal direction in two or more sections, which are fastened to one another by an appropriate hinge, for instance a flexible rubber or plastic member that allows the probe to be bent in a certain plane. The plane runs along the axis of the vessel, when the probe is fastened to the wall of the vessel and the vessel is a cylindrical one. Another definition for the plane in which the probe is able to bend is a plane running along the centrelines of the first and second fastening device used for fastening the probe to the wall of the vessel. Preferably, the hinge/s is/are made or adjusted such that the probe is able to bend only in one direction from its straight or substantially straight basic configuration, i.e. only such that the second end when meeting the opposite side wall of the vessel bends towards the second opening. In the above discussed embodiment the probe has fastening device at least at both ends, but it is also possible that additional fastening devices (or means) are arranged somewhere over the length of the probe. When the probe is made of two sections the intermediate fastening device is preferably, but not necessarily, close to the hinge. When the probe is made of three sections the fastening device may be arranged close to the hinges or to the section at the longitudinal centre of the probe. The additional fastening device(s) is/are preferably but not necessarily bolt/s, threaded sleeve/s or threaded hole/s arranged in communication with the probe, whereby the wall of the vessel includes corresponding hole/s or opening/s. The hole/s or opening/s may include support plate/s, if considered worthwhile.

In addition to what has been discussed above about the construction of the fastening devices, i.e. the fact that the fastening devices are arranged at the ends of the probe, it is naturally possible in all embodiments and variants of the present invention to extend the probe (and one or more electrodes thereof) at one or both ends past the fastening devices, whereby it could be said more generally that the fastening devices are arranged along the length of the probe and at a distance from one another. It is also naturally possible that the first fastening device is at the first end of the probe and the second fastening device is at a distance from the second end, or vice versa. In other words, it has to be understood that the first end members 26 and 126 and the second end members 32 and 132 discussed in connection with FIGS. 2-7 do not necessarily only form the first end and the second end of the probe but extend as far along the probe as is needed so that the fastening devices will be arranged in connection with the end member. Thus, as a consequence, the end member may also be include one or more sensors.

Also it is possible that the vessel includes only one permanent opening for the probe. This may be accomplished in two different ways.

First, the wall of the vessel may include one opening for installing the probe and another (temporary) opening via which a pocket like member for the second end of the probe is installed inside the vessel wall. After the pocket like member is installed on the inside wall the opening may be closed permanently. One option is to cut an opening in the wall and remove a part therefrom, weld the pocket like member on the inside surface of the removed part and weld the part back to fill the opening. When installing the probe it is fairly easy to push the second end of the probe into the pocket and thereafter fasten the first end of the probe to the wall. The pocket-like member may also be replaced with guide rails, guide sleeve or some other appropriate device (or means) securing the second end of the probe to the wall of the vessel. As to the rails, sleeve or other guide device (or means), it is apparent that their positioning need not necessarily be aligned with the end of the probe, but the end of the probe may pass the guide device when pushed in place.

Second, in some specific cases, i.e. for instance when the fluid in the vessel is easily flowable and/or otherwise does not subject the probe to strong forces and/or when the probe is not too long and/or the probe is manufactured of a rigid material and dimensioned such that fastening the probe by a single fastening device presses the probe tight against the wall, it is possible to manage with a single fastening device arranged to the probe. Such fastening devices are, preferably but not necessarily, located at or at least close to an end of the probe. However, it is also possible to design the probe such that it may be installed via a single opening inside the vessel, then position the fastening device in the opening and attach the probe such that the electrodes of the probe extend both above and below the opening.

As to the surface level-related information transmitting device, it should be understood that the transmitting device may be arranged in connection with the second end member or fastening device, too, especially if the transmitting device is a socket-plug type connection or a wireless transmitter.

A yet further option when measuring the surface level in a narrow but high vessel is to arrange on the vessel wall two or more probes to measure one after another the surface level of the fluid to cover the area where the surface level information is needed. Arranging the probes one after another to measure the surface level of the fluid does not necessarily mean that the probes are arranged along the same vertical line on the vessel wall but the probes may be positioned at the best possible positions on the internal circumference of the wall of the vessel such that when, in a vertical direction, the range of measurement of one probe terminates, the range of measurement of another probe is initiated, and so on. When arranging the probes in the above explained manner each probe may be freely placed on the vessel circumference, i.e. to such a location where there is best free room for the probe.

Figure 10:
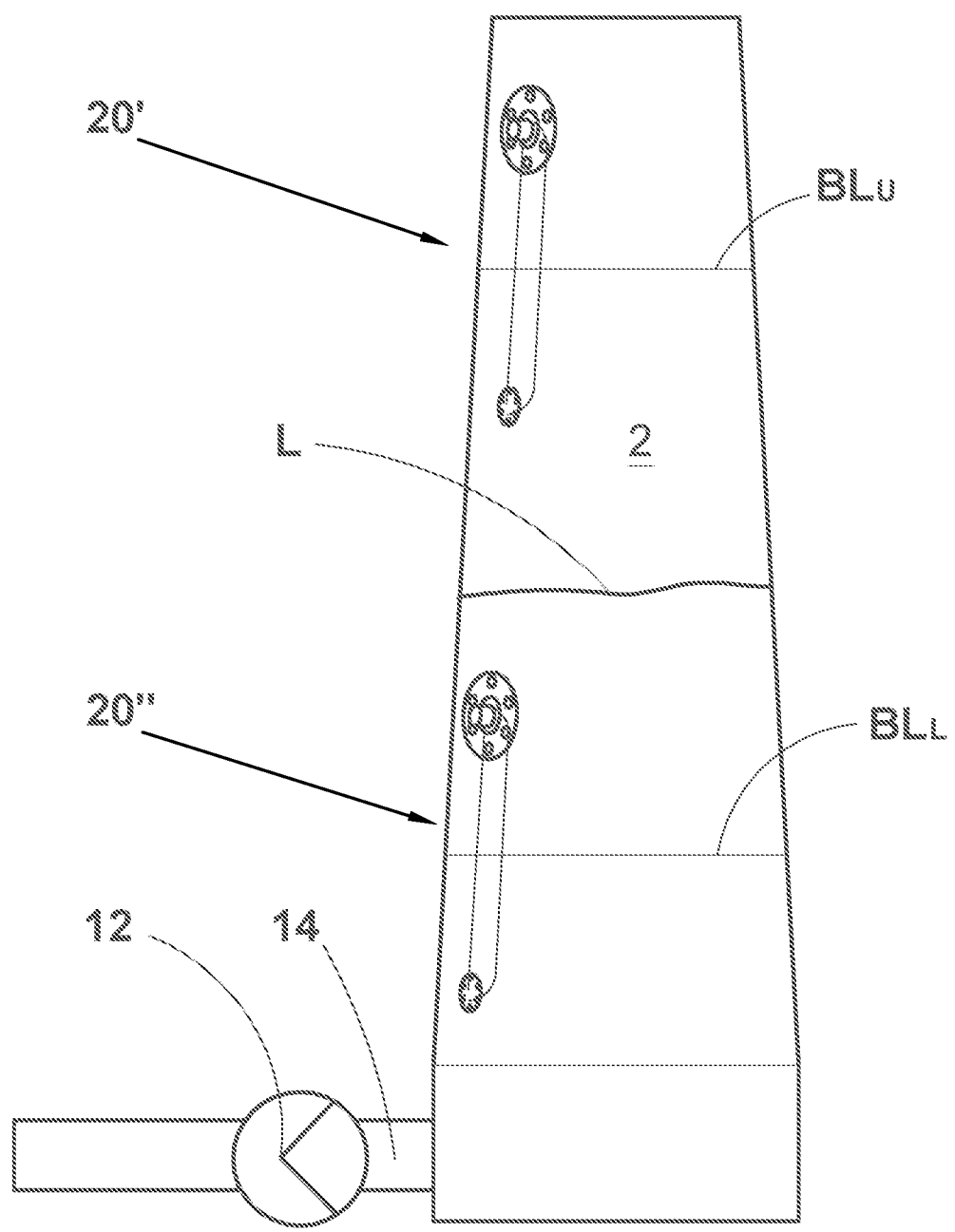

As to the use of the surface level monitoring apparatus it is clear that it may be used to indicate the surface level of a fluid in a vessel when the desired surface level is between the lowermost and topmost electrodes of a single probe or of a set of probes measuring the surface level over the entire desired surface level range. However, when the vessel is high, for instance of the order of 15-30 meters, and the area where the surface should be maintained (or allowed to fluctuate) is substantially high, too, for instance of the order or 7 to 20 meters, it is not worthwhile arranging in the vessel a single probe or a set of probes having a length corresponding to the entire height of the vessel, but the surface level control may be attained as shown in FIG. 10 by arranging two probes in the vessel, i.e. a lower probe 20" having its longitudinal/vertical mid-point at or near the lower borderline $BL_L$ of the "allowed" surface level, and an upper probe 20' having its longitudinal/vertical mid-point at or near the upper borderline $BL_U$ of the "allowed" surface level. In other words, there is a clear gap between the lower end of the upper probe and the upper end of the lower probe, i.e, an area where the surface level of the fluid may freely fluctuate. When the probes are arranged as described on the wall of the vessel 2, the surface level control system or unit gets information on the surface level before the surface level in the vessel has advanced to its lower or upper borderline. Thus, the control system has time to react, i.e. to increase or decrease the discharge from the vessel 2 and/or to increase or decrease the feed into the vessel 2. In other words, the purpose of the two probes and the control unit is to maintain the surface level L of the fluid between the upper and lower borderlines in the vessel 2 by providing a control unit with information from two separate probes 20' and 20", i.e. an upper probe 20' and a lower probe 20". The control unit increases feed into the vessel and/or decreases discharge from the vessel if the lower probe 20" informs the control unit that the surface level L is approaching the lower borderline $BL_L$ from above. In a corresponding manner the control unit decreases feed into the vessel and/or increases discharge from the vessel if the upper probe (20") informs the control unit that the surface level L is approaching the upper borderline $BL_U$ from below.

While the present invention has been herein described by way of examples in connection with what are at present considered to be the most preferred embodiments, it is to be understood that the invention is not limited to the disclosed embodiments, but is intended to cover various combinations and/or modifications of its features and other applications within the scope of the invention as defined in the appended claims.

The invention claimed is:

1. A method of installing a probe inside a vessel for monitoring a surface level of a fluid in the vessel from outside the vessel, the vessel having a side wall and the probe having a first end, a second end, a detection unit therebetween, at least a first fastening device and at least a second fastening device for fastening the probe to the side wall of the vessel and at least one device for transmitting surface level-related information out of the vessel, the method comprising the steps of:

providing the vessel side wall with a first opening;
providing the vessel side wall with a second opening through the side wall;
passing the second end of the probe, the second fastening device for fastening the probe and the detection unit of the probe through the first opening and inside the vessel;
orienting the second end of the probe towards the second opening;
attaching the second end of the probe to the side wall of the vessel at the second opening; and
fastening the first end of the probe to the side wall of the vessel at the first opening.

2. The vessel employed in the method of claim 1, wherein the detection unit has a plurality of sensors along a length thereof, and a transmitting device, when in use, configured to transmit surface level-related information from the sensors to a control device, the probe including the first device and at least the second device configured to fasten the probe, when in use, to the side wall of the vessel, the transmitting device being arranged in connection with at least one of the first fastening device and the second fastening device of the probe inside the vessel.

3. The vessel as recited in claim 2, wherein the second fastening device comprises at least one bolt or at least one threaded hole.

4. The vessel as recited in claim 2, wherein the first and the second fastening devices are arranged along the length of the probe at a distance from one another or at ends of the probe.

5. The vessel as recited in claim 2, wherein the first fastening device includes a flange arranged in connection with the probe.

6. The vessel as recited in claim 2, wherein the probe includes a first end member attached to the detection unit, the first fastening device being arranged in connection with the first end member.

7. The vessel as recited in claim 6, wherein the flange is arranged on the first end member at a distance from the detection unit.

8. The vessel as recited in claim 2, wherein the detection unit is formed from a plurality of longitudinal sections, the sections being coupled to one another by a hinge.

9. The vessel as recited in claim 8, further comprising a third fastening device disposed along a length of the detection unit.

10. The vessel as recited in claim 2, wherein the probe includes a device configured to seal, when in use, the probe in relation to the side wall of the vessel along the length of the probe.

11. The vessel as recited in claim 2, wherein the transmitting device is one of a continuous wiring, a wiring including a socket-plug connection and a wireless transmitter for transmitting the surface level-related information from the sensors to the control device.

12. The vessel as recited in claim 2, wherein the probe is configured to operate based on one of resistance measurement, capacitance measurement, pressure measurement, electrical impedance tomography, electrical resistance tomography and electrical capacitance tomography.

13. The vessel as recited in claim 2, wherein the second fastening device comprises one threaded sleeve alone, or in connection with a second flange.

14. The method as recited in claim 1, wherein the providing the vessel side wall with the first opening includes dimensioning the first opening to enable entrance of the second fastening device of the probe inside the vessel.

15. The method as recited in claim 1, wherein the providing the vessel side wall with the second opening includes dimensioning the second opening to receive the second fastening device and for fastening the probe to the side wall of the vessel at the second opening.

16. The method as recited in claim 1, wherein after the providing the vessel side wall with the first opening, providing the side wall of the vessel around the first opening with a first support plate having an opening.

17. The method as recited in claim 1, wherein after the providing the vessel side wall with the second opening, providing the side wall of the vessel around the second opening with a second support plate having an opening.

18. The method as recited in claim 1, wherein the providing the vessel side wall with the first opening includes extending the first opening in vertical direction to enable taking of the probe in an inclined orientation inside the vessel.

* * * * *